(12) United States Patent
Stock

(10) Patent No.: US 11,919,101 B2
(45) Date of Patent: Mar. 5, 2024

(54) APPARATUS AND METHOD FOR BUTT-WELDING WORKPIECES

(71) Applicant: August Strecker GmbH & Co. KG Elektro-Schweissmaschinen Fabrik, Limburg (DE)

(72) Inventor: Michael Stock, Limburg (DE)

(73) Assignee: August Strecker GmbH & Co. KG Elektro-Schweissmaschinen Fabrik, Limburg (DE)

( * ) Notice: Subject to any disclaimer, the term of this patent is extended or adjusted under 35 U.S.C. 154(b) by 580 days.

(21) Appl. No.: 17/276,851

(22) PCT Filed: Dec. 2, 2019

(86) PCT No.: PCT/EP2019/083349
§ 371 (c)(1),
(2) Date: Mar. 17, 2021

(87) PCT Pub. No.: WO2020/114980
PCT Pub. Date: Jun. 11, 2020

(65) Prior Publication Data
US 2021/0394296 A1    Dec. 23, 2021

(30) Foreign Application Priority Data

Dec. 4, 2018 (DE) .......................... 102018130769.1

(51) Int. Cl.
*B23K 11/02* (2006.01)
*B23K 11/00* (2006.01)
(Continued)

(52) U.S. Cl.
CPC .......... *B23K 11/02* (2013.01); *B23K 11/0073* (2013.01); *B23K 37/0443* (2013.01); *B23K 37/08* (2013.01); *B23K 2101/32* (2018.08)

(58) Field of Classification Search
CPC .......................... B23K 11/02; B23K 11/0073; B23K 37/0443; B23K 37/08; B23K 2101/32; B23K 11/046
See application file for complete search history.

(56) References Cited

U.S. PATENT DOCUMENTS

| 3,400,240 A | 9/1968 | Reitsch |
| 4,993,896 A * | 2/1991 | Dombrowski ............ B23C 3/12 |
| | | 409/138 |
| 5,650,077 A | 7/1997 | Zinke |

FOREIGN PATENT DOCUMENTS

| DE | 1130541 A1 | 5/1962 |
| DE | 2143917 A1 | 3/1973 |

(Continued)

*Primary Examiner* — Robert G Bachner
(74) *Attorney, Agent, or Firm* — Rogowski Law LLC

(57) ABSTRACT

A butt-welding device and a method for butt welding workpieces, especially for double-upset resistance-pressure butt-welding of workpieces, particularly wires, strands and profiles, has first and second clamping members for receiving the ends of the workpieces that are to be joined. At least one clamping means can be moved between a starting position and a welding position. At least one deburring tool is provided for deburring the welded workpiece ends. In addition, at least one sensor is provided to determine the geometric dimensions of the workpieces that are to be joined, especially the diameter, the width or the height in the joining plane or substantially parallel thereto, wherein a control unit controls the movement of the clamping members and/or of the deburring tool as a function of the geometric dimension.

12 Claims, 6 Drawing Sheets

(51) Int. Cl.
*B23K 37/04* (2006.01)
*B23K 37/08* (2006.01)
*B23K 101/32* (2006.01)

(56) References Cited

FOREIGN PATENT DOCUMENTS

| | | |
|---|---|---|
| DE | 2541022 A1 | 5/1977 |
| DE | 2839537 A1 | 3/1979 |
| DE | 2914539 A1 | 10/1980 |
| DE | 2934423 A1 | 3/1981 |
| DE | 3232560 A1 | 3/1984 |
| DE | 9302850 U1 | 8/1994 |
| GB | 2305778 A | 9/1981 |
| JP | H0871761 A | 3/1996 |

* cited by examiner

APPARATUS AND METHOD FOR BUTT-WELDING WORKPIECES

CROSS-REFERENCE TO RELATED APPLICATIONS

This application is a national stage application (under 35 USC § 371) of PCT/EP019/083349, filed Dec. 2, 2019, claiming priority to DE 10 2018 130 769.1, filed Dec. 4, 2018, the contents of each of which are incorporated by reference herein.

BACKGROUND OF THE INVENTION

Technical Field and State of the Art

The invention relates to a device and to a method for butt welding workpieces.

It is a generally known procedure to join workpieces, especially the ends of wires, strands or profiles, by means of appropriate butt-welding devices. The workpieces are joined by means of a preferably automated butt-welding procedure, so as to create a workpiece having the desired length.

When it comes to the prior-art devices, the ends, for example, of wires, are welded together at their end faces. For this purpose, as a rule, the device has two clamping jaws which can be moved relative to each other and into which the wire ends are clamped. Subsequently, the clamping jaws with the wire ends are moved towards each other and the welding procedure is initiated. During the welding, the material of the wire ends is then upset, a process in which burrs are formed at the weld or at the seam. These burrs can be removed, for instance, by means of a plane-like tool.

The material to be welded is often rebar steel, but other material grades can also be joined in this manner such as steels with a high content of carbon or else alloyed steels as well as non-ferrous materials such as copper, aluminum or their alloys.

Depending on the grades, various annealing options are possible, including programmable microprocessor control of the welding and annealing procedures, or, of course, also regulatable infrared pyrometers.

Likewise known are so-called double-upset butt-welding machines with an automatic deburring apparatus. The double upset yields an excellent welding strength. Almost all of the heated, liquefied material is pressed out of the joint. This gives rise to a weld of extremely high quality. The automatic deburring apparatus that is integrated into the process sequence yields welds whose diameters are the same as the original material. Moreover, the risk of wire breakage caused by excessive deburring is almost completely eliminated. In other words, the precisely replicable, exactly reproducible, diameter-identical welded joints of highest quality, even in the case of a difficult material, constitute a solid foundation for the further production processes.

Moreover, German patent application DE 21 43 917 A1 discloses a resistance butt-welding machine for welding cables using a ceramic tube that surrounds the cable ends, whereby a holder that immovably surrounds the one-piece or split ceramic tube during welding is arranged between clamping devices for the cable ends that are to be welded.

German patent application DE 29 34 423 A1 discloses a method for the electric butt welding of metallic conductors in the form of wires or strands, a process in which the ends of the metallic conductors that are to be joined are butt welded at their end cross sections and the joint of the butt-welded conductor is upset at an elevated temperature. Subsequently, the enlarged cross section of the upset zone is reduced to its final cross section by means of cold deformation.

German patent application DE 28 39 537 A1 discloses a device to feed and automatically butt weld iron wires, whereby support and guide elements that are provided with stops and that serve to advance the iron wires are arranged in pairs. Grippers hold the ends of the iron wires and allow the subsequent movement of the iron wires that are blocked in the clamping jaws of the device. Moreover, means for ejecting the welded iron wire are provided.

German patent application DE 1 130 541 A1 relates to a method and to a device for resistance flash-butt welding of the ends of strips and for subsequently processing the seam by incrementally transporting the strip into stationary processing stations.

A drawback of the prior-art devices for butt welding workpieces, for example, wires, strands or profiles is that, when the welded burr is deburred at the weld, damage to the workpiece as well as to the deburring tool can occur if there are different geometric dimensions in the joining plane or essentially parallel thereto, for instance, different wire diameters or profile heights of the wires or profiles that are to be joined. This can especially be the case if the deburring tool acts on the burr from the side at the weld that has the smaller wire diameter. After all, during deburring, the deburring opening is set as a function of the diameter of the wire. If the deburring tool approaches the weld that is to be deburred from the side having the smaller wire diameter, then the deburring opening is set too small relative to the wire having the larger diameter. Consequently, since the pre-set opening is not correctly set, this wire with the larger diameter as well as the deburring tool itself are damaged. Moreover, undesired burr residues can remain at the weld.

As a rule, in the case of prior-art devices, the burr that is being formed at the weld is always removed from the right-hand side during the joining. For this reason, the right-hand clamping jaw of the device is configured so as to be movable so that the wire inserted from the right-hand side of the device can be advanced during the welding procedure. The clamping jaw with the wire on the left-hand side is stationary. Since the user of the device cannot see with the naked eye which of the wires might have a slightly larger or smaller diameter, it is often the case that the deburring tool acts from the side onto the weld that is to be deburred and that has the smaller wire diameter. This then leads to the above-mentioned damage to the workpiece and to the tool.

Before the backdrop of the above-mentioned disadvantages, the invention is based on an objective of putting forward a device and a method for butt welding which avoids these disadvantages.

SUMMARY OF THE INVENTION

In a first aspect, the invention relates to a butt-welding device for butt welding, especially for double-upset resistance butt-press welding of workpieces, particularly wires, strands and profiles, said device comprising first and second clamping members for receiving the ends of the workpieces that are to be joined, wherein at least one clamping member can be moved between an initial position and a welding position, and also comprising at least one deburring tool for deburring the welded workpiece ends.

A workpiece that is to be clamped such as, for instance, a wire, is associated with each of these clamping members. The clamping members can be moved relative to each other between the resting position and the welding position, for instance, by means of a drive, so that the clamped ends of the workpiece can be moved towards each other until they meet.

Once the welding current has heated the appertaining edge areas of the workpiece, the clamping members are once again moved relative to each other, a process in which the wire ends are joined and a burr is formed around the weld seam or joint. This burr has to be removed by means of the deburring tools.

According to this aspect of the invention, at least one sensor is provided to determine the geometric dimensions of the workpieces that are to be joined, especially the diameter, the width or the height in the joining plane or essentially parallel thereto, wherein a control unit controls the movement of the clamping members and/or of the deburring tool as a function of the geometric dimension.

The clamping members or the deburring tools can be actuated by means of the control unit in such a way that the wire that has already been welded is deburred from the left-hand or right-hand side of the weld as a function of the geometric dimensions. In particular, the wire is to be deburred from the side having the larger geometric dimensions, especially the larger wire diameter. As a result, damage to the wire as well as to the deburring tool can be largely prevented.

According to a first advantageous refinement of the invention, the at least one sensor is configured as a displacement sensor. A displacement sensor measures the distance between an object, for instance, the clamping member and a reference position, for example, a stationary point on the device. Displacement sensors can be additionally used for distance measurements in order to determine the dimensions, i.e. the height, thickness and width of a workpiece. Depending on the requirements in question, the measurements can be carried out employing light or magnetic fields or sonic waves, or else in direct contact with the workpiece. This allows a simple execution of a precise measurement of a geometric dimension of the workpiece. In particular, on the basis of the measured dimension, a geometric dimension of the workpiece, for instance, the diameter of a wire, can be determined with sufficient precision and then transmitted to the control unit.

The sensor can be arranged on a mount for the clamping members on the device, especially on the side at the top, on a so-called jaw carrier.

In another advantageous embodiment of the invention, it is provided that each deburring tool is associated with a clamping member and can be moved together with the clamping member. In this manner, the deburring tool can be moved together with the clamping member, so that there is no need for additional drives to move the deburring tool, especially in parallel to the workpiece.

It can thus be provided for the deburring tool to be movable in the direction of motion of the clamping member depending on the clamping member. As an alternative, it is also conceivable for the deburring tool to be movable in the direction of motion of the clamping member independently of the clamping member. This translates into more degrees of freedom for the motion of the deburring tool.

Particularly in order to re-adjust the deburring tool, especially a deburring blade arranged on the deburring tool, another advantageous embodiment of the invention provides for the deburring tool to be adjustably held on a holder that is optionally connected to the clamping member. In this manner, the deburring tool can be re-adjusted, for example, if it shows signs of wear and tear that would cause the properties of the deburring tool necessary for the deburring such as, for instance, the sharpness of the blade, to no longer be sufficient.

According to another advantageous embodiment of the invention, each clamping member has two axially adjustable clamping jaws between which the workpiece can be clamped. In each case, a wire, especially the end of a wire, is clamped between these clamping jaws and then moved together with the clamping member so that the clamped wire ends meet and can then be welded together. Advantageously, the clamping members, particularly the clamping jaws, can also additionally serve to carry current, that is to say, the current needed for the welding procedure can be fed via the clamping jaws into the workpieces that are to be joined.

In order to facilitate the insertion of the workpieces into the device, a stop can be provided for purposes of positioning and aligning at least one of the workpieces in the device. To start with, the first workpiece can thus be inserted into the device and aligned against the stop. In this manner, the workpiece can then be precisely positioned in the device. Subsequently, the stop can be removed, for instance, it can be retracted, so that it is no longer in contact with the workpiece. Finally, the other workpiece that is to be joined can be inserted into the device, whereby the workpiece that has already been inserted into the device can serve as a stop for the insertion and the positioning.

According to an independent idea of the invention, a method for butt welding, preferably for the double-upset resistance butt-press welding of workpieces, particularly wires, strands and profiles, especially employing a butt-welding device, is characterized by the following steps:

a) inserting the workpieces that are to be joined into a butt-welding device, b) bringing to the welding site the ends of the workpieces that are to be joined, c) determining at least one geometric dimension of the workpieces, especially the diameter, the width or the height in the joining plane or essentially parallel thereto before the butt welding, d) butt welding the end cross sections of the workpiece ends that are to be joined, e) upsetting the weld of the butt-welded workpiece at an elevated temperature in order to bring about a considerable enlargement of the cross section, f) reducing the enlarged cross section to a prescribed end cross section of the workpiece by means of a deburring tool, and g) actuating at least one of the deburring tools as a function of the geometric dimensions of the workpieces that are to be joined.

In a first advantageous embodiment of the method according to the invention, when it comes to workpieces that are to be joined and that have different geometric dimensions, the deburring tool that is employed is the one that is associated with the workpiece having the larger geometric dimension. Moreover, the deburring height or the deburring opening is set to this larger geometric dimension, for instance, the larger diameter of a wire. In other words, the deburring tool that is associated with the larger geometric dimension and that has the correctly set deburring opening is the one that is employed. In this manner, damage to the deburring tool or to the wire can be largely avoided.

If there is no significant difference between the relevant geometric dimensions of the workpieces that are to be joined, it is a standard procedure for the control unit to instruct one of the deburring tools to carry out the deburring, for example, always on the right-hand side. After all, this side is the one that is provided for deburring in the prior-art devices, in other words, the side that is familiar to the users of the devices.

Additional objectives, advantages, features and application possibilities of the present invention ensue from the description below of an embodiment making reference to the drawings. In this context, all of the described and/or depicted features, either on their own or in any meaningful combination, constitute the subject matter of the present invention, also irrespective of their compilation in the claims or the claims to which they refer back.

DESCRIPTION OF THE DRAWINGS

In this context, the following is shown, at times schematically.

DETAILED DESCRIPTION

Figure 1:
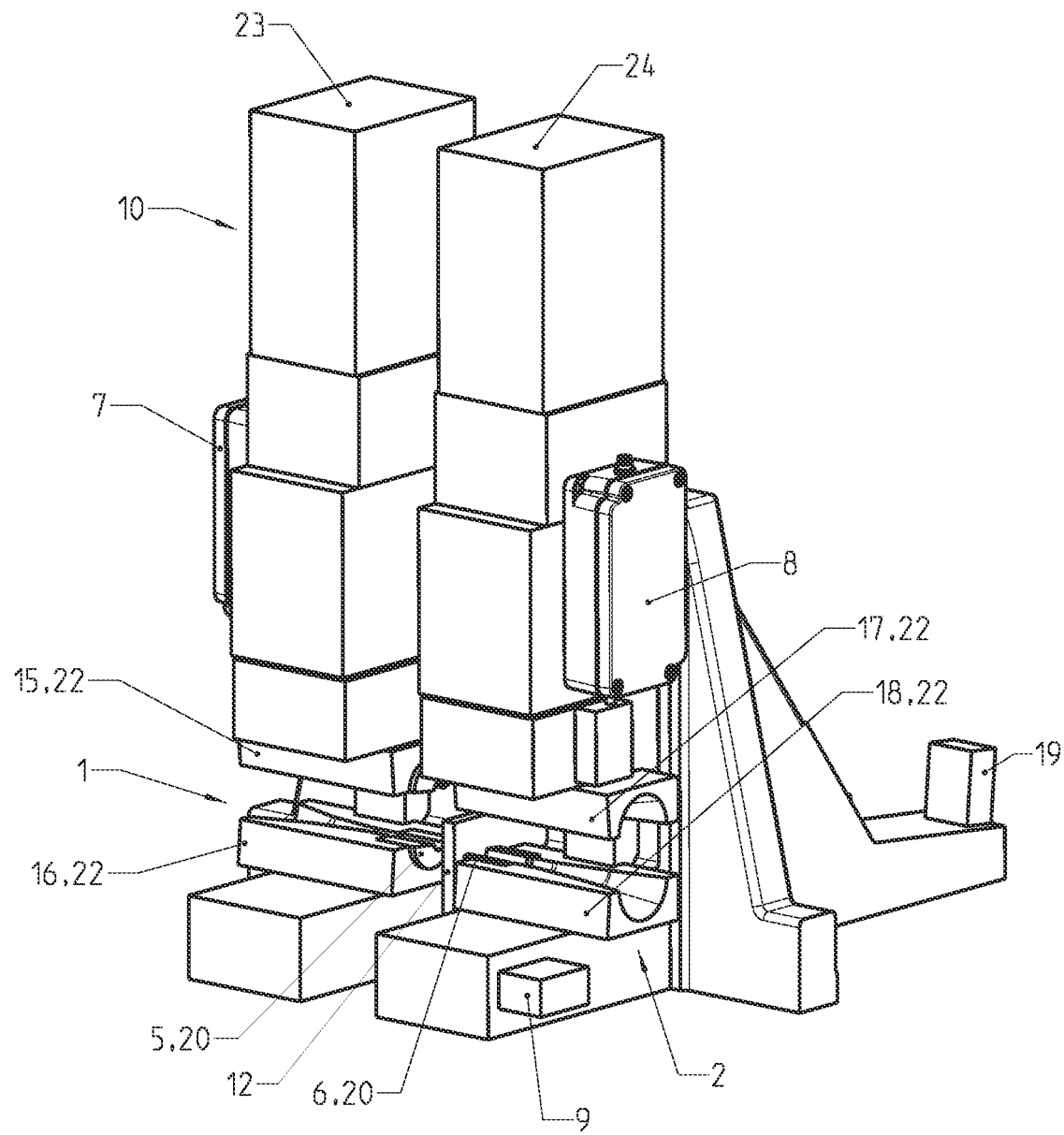
FIG. 1 the butt-welding device with two clamping members, without inserted workpieces, FIG. 2 the device as shown in FIG. 1, with inserted workpieces, whereby the workpiece having the relatively larger diameter is situated on the right-hand side of the device, FIG. 3 the device as shown in FIG. 2, whereby the workpiece having the relatively larger diameter is situated on the left-hand side of the device, FIG. 4 the device as shown in FIG. 2, in a detailed view, FIG. 5 method steps a) to j) for butt welding workpieces in a first arrangement, and FIG. 6 method steps a) to j) for butt welding workpieces in a second arrangement.

For the sake of clarity, identical components or those having the same effect are provided with the same reference numerals in the figures shown and described below.

FIG. 1 shows a butt-welding device 10 without inserted workpieces 3, 4. Examples of workpieces 3, 4 for carrying out the method according to the invention employing a device 10 according to the invention as shown in FIGS. 2 to 6 comprise wire conductors 3, 4 or wires. These are unwound, for instance, from a supply coil and then fed hydraulically or pneumatically to clamping jaws 15, 16, 17, 18 that can be moved axially relative to each other and that are part of a first and second clamping member 1, 2 that can also serve to supply current.

Each of these clamping members 1, 2 having the clamping jaws 15, 16, 17, 18 is associated with a wire 3, 4, especially a wire end or workpiece end 13, 14 that is clamped by means of the clamping members 1, 2. The clamping members 1, 2 can be moved relative to each other between the resting position and the welding position, for instance, by means of a drive 9, so that the clamped wire ends 13, 14 can be moved towards each other horizontally until the wire ends 13, 14 meet. Naturally, it can be alternatively provided (in an embodiment not shown here) that the clamping members 1, 2 are aligned in such a way that they can be moved in the vertical direction.

The clamping jaws 15, 16, 17, 18 are used to butt weld wire ends 13, 14 of the wires 3, 4 that were previously neatly cut and that are to be joined to each other in a known manner (German Preliminary Published Application DE-OS 25 41 022). The welding burr 21 that is formed during the welding is likewise removed in a known manner (German Preliminary Published Application DE-OS 25 41 022) by the relative movement of the clamping jaws 15, 16, 17, 18 with the deburring tools 5, 6 that are arranged on them.

After the butt welding, the joint or weld 11 is upset at an elevated temperature, for instance, at least 450° C., in order to bring about a cross section enlargement, for example, of at least 40%.

The welding current needed for the welding procedure can be fed into the wire 3, 4 via the clamping jaws 15, 16, 17, 18 that are each arranged on the clamping members 1, 2.

Once the wire ends 13, 14 have been heated up in the edge areas by the welding current, the clamping members 1, 2 are moved once again relative to each other, a process in which the wire ends 13, 14 are joined and a welding burr 21 is formed around the weld seam or joint 11. The individual method steps are described in detail in FIGS. 5 and 6.

The deburring tools 5, 6 each comprise blade carriers 22 that are arranged on the clamping members 1, 2 and that have deburring blades 20 arranged on them. The deburring tools 5, 6 in the case here are fastened to the clamping members 1, 2 by screws. The blade carriers 22 can be moved together with the clamping members 1, 2 essentially parallel to the wire direction over the weld seam or joint 11.

If the deburring tool 5, 6 is always moved over the weld seam 11 exclusively from one side, completely irrespectively of the geometric dimensions of the workpieces 3, 4, as is the case in the state of the art, then drawbacks arise that are overcome by the device according to the invention and by the method according to the invention. After all, before the deburring tool 5, 6 starts the deburring procedure by means of the control unit 19, the sensors 7, 8 determine at least one geometric dimension—in the joining plane or essentially parallel thereto—of the workpieces 3, 4 that are to be joined.

In the present embodiment, the diameter of the wires 3, 4 that are to be joined is determined by means of the sensors 7, 8. However, it is likewise conceivable for the width or the height in the joining plane or essentially parallel thereto to be determined, especially in the case of profiled parts.

The sensors 7, 8 employed can be a displacement measuring system that measures a displacement employing potentiometric, optical or mechanical means, for instance, a cable control. It is likewise conceivable to use a displacement pickup consisting of a glass rod marked with a series of ultrafine lines that are optically scanned.

These sensors 7, 8 determine the geometric dimension of the workpieces 3, 4 in the joining plane or essentially parallel thereto. For instance, the sensors 7, 8 can be used to measure the necessary distance between each of the associated clamping jaws 15, 16, 17, 18 for clamping the workpieces 3, 4, so that the diameter of the appertaining wire 3, 4 can be determined on the basis of this data. The precision of this measurement can between at about $\frac{1}{10}$ mm.

Figure 2:
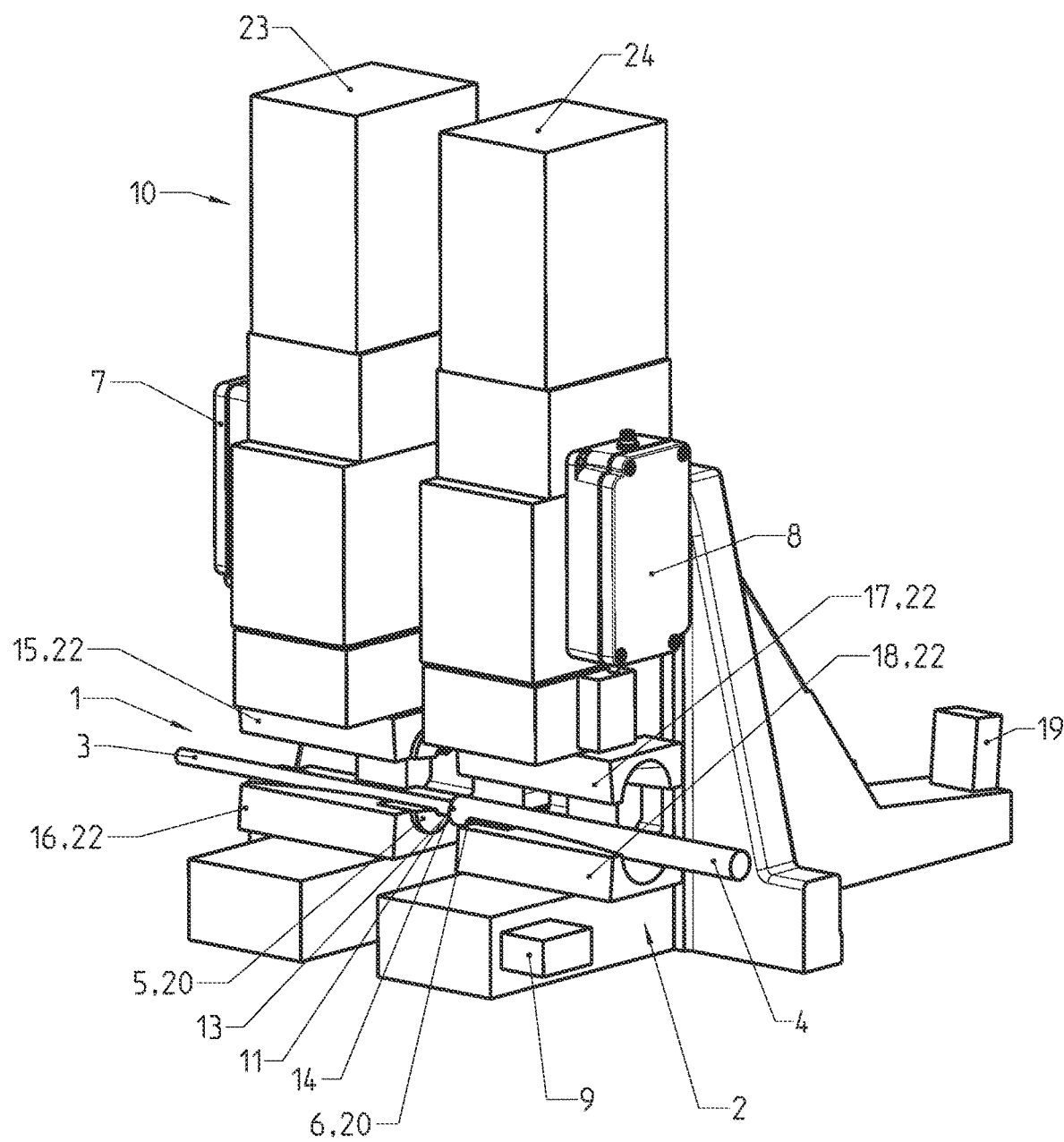
Figure 3:
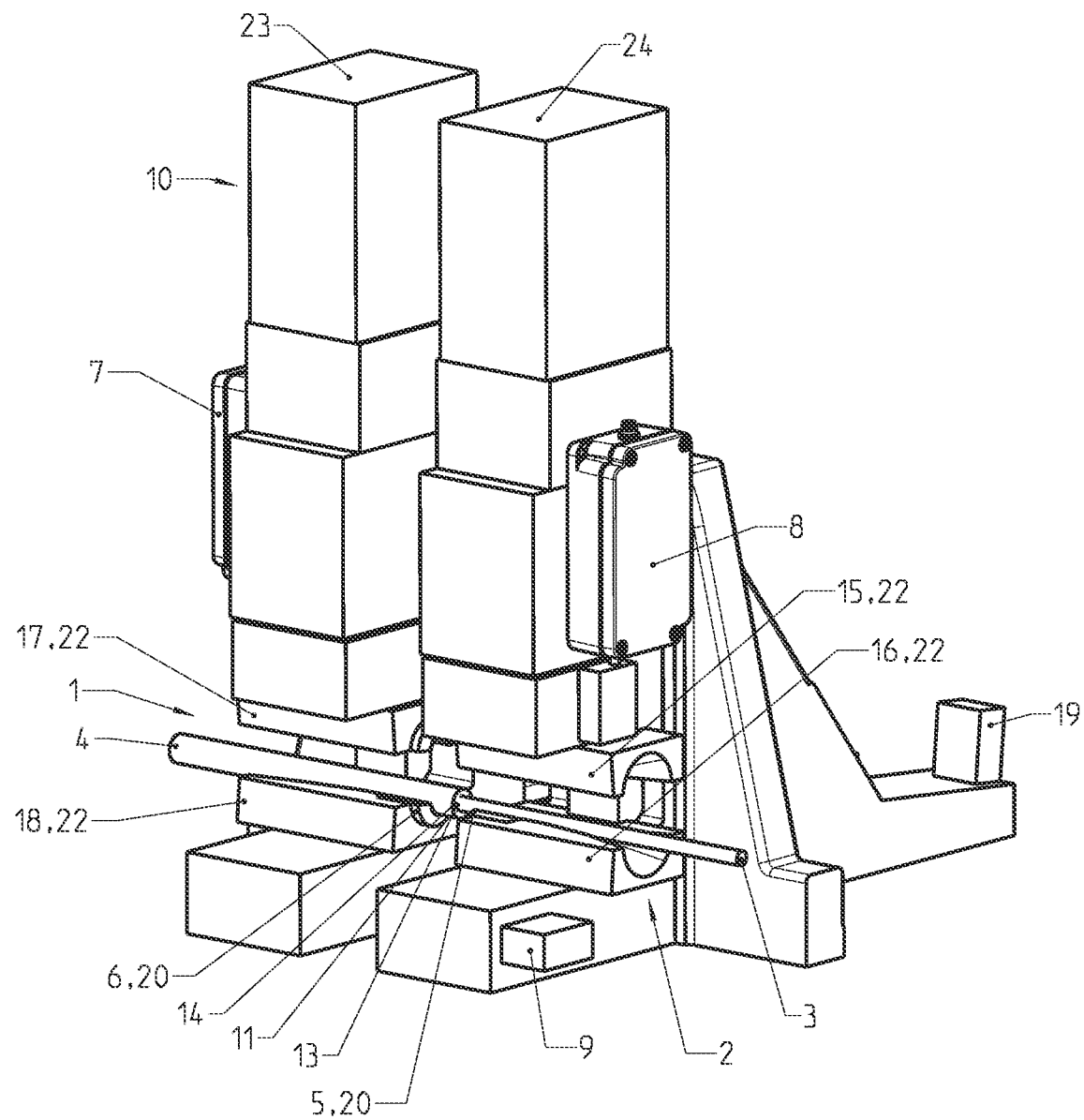
Figure 4:
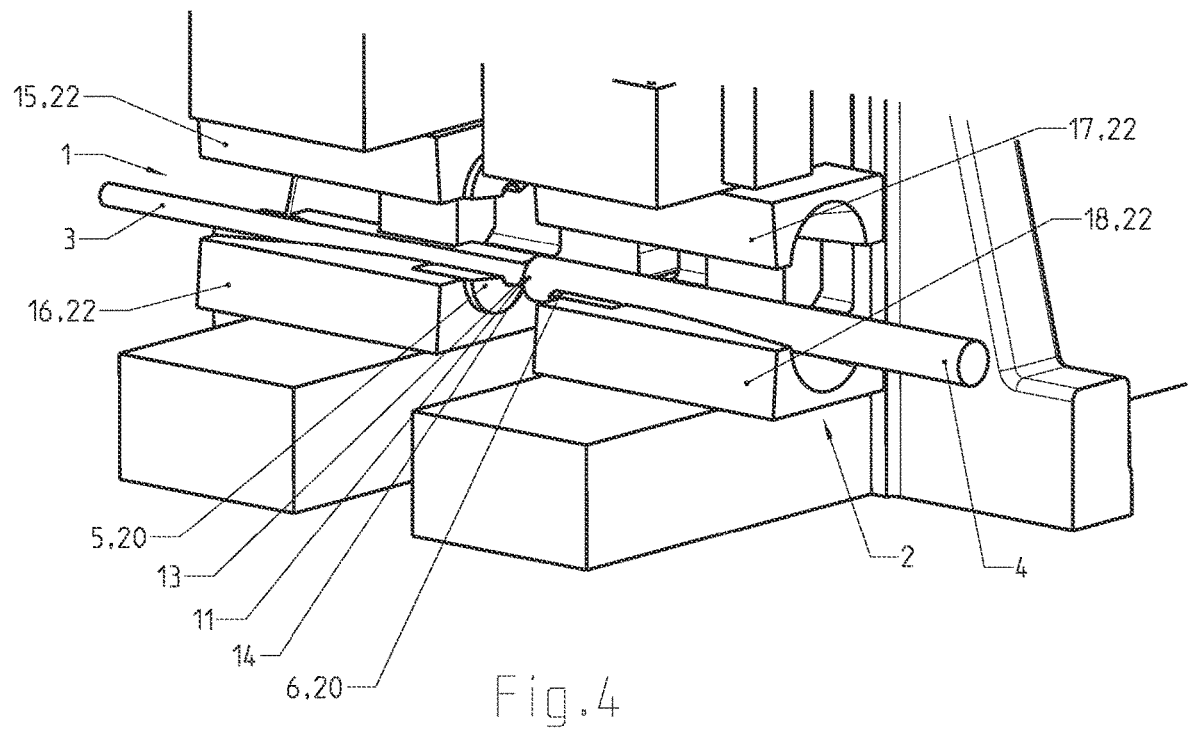

In this context, the sensor 7, 8 is arranged on the side at the top on a so-called jaw carrier, that is to say, on a mount of the device 10 for the clamping members 1, 2, as can be seen in FIGS. 1 to 3.

Particularly in order to re-adjust the deburring tool 5, 6, for instance, the deburring blade 20 arranged on the deburring tool 5, 6, the latter is adjustably held on a holder or blade carrier 22 that is optionally connected to the clamping member 1, 2. In this manner, the deburring tool 5, 6 can be re-adjusted, for example, if it shows signs of wear and tear that would cause to the properties of the deburring tool necessary for the deburring such as, for instance, the sharpness of the deburring blade 20, to no longer be sufficient.

The method steps for butt welding workpieces 3, 4 will be explained below on the basis of FIGS. 5 and 6.

Figure 5:
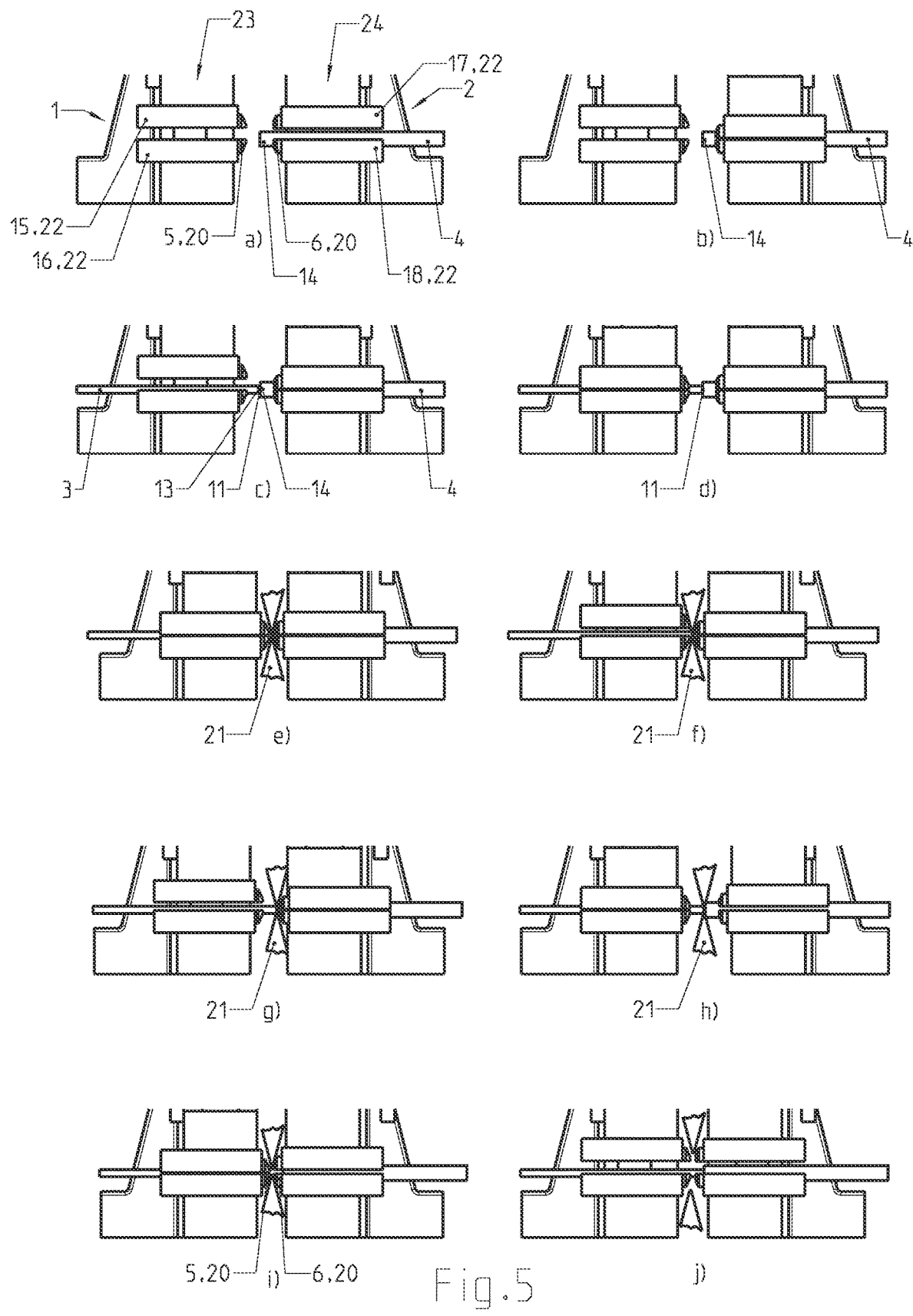

FIG. 5 a) to j) depicts the method steps for butt welding two wires 3, 4, whereby in the present embodiment, the wire 3 that was inserted into the device 10 on the left-hand side 23 has a smaller diameter than the wire 4 that was inserted on the right-hand side 24.

Specifically, in the butt welding of the wires 3, 4 being presented here, the following steps are carried out: FIG. 5 *a*) inserting the first wire 4 into the device 10, b) securing the wire 4 by means of the clamping jaws 15, 16 of the first clamping member 1. Subsequently, in step c), the second wire 3 is inserted into the device 10 and then, in step d), clamped in place by means of the clamping jaws 17, 18.

Then, as shown in FIG. 5 *e*), the welding procedure takes place in a familiar manner. Subsequently, the weld is released in steps e) to h) so that the deburring procedure can take place.

Once the sensors 7, 8 have determined that the wire 4 that, in the present embodiment had been inserted on the right-hand side 24, has the relatively larger diameter than the other wire 2, the sensors 7, 8 emit a signal to this effect to the control unit 19. Then the clamping member 2 associated with the right-hand side 24 of the device 10, in other words, the side having the larger wire diameter, is moved in order for the deburring procedure to be carried out, as is shown in FIG. 5 *i*).

Finally, the clamping members 1, 2 release the welded wire; see FIG. 5 *h*).

The butt welding takes place in a manner similar to the case in which the wire 3 having the larger diameter is inserted on the left-hand side 23 instead of on the right-hand side 24 of the device 10. Consequently, the method steps of FIG. 6 *a*) to *f*) correspond to those of FIG. 5 *a*) to *f*).

Figure 6:
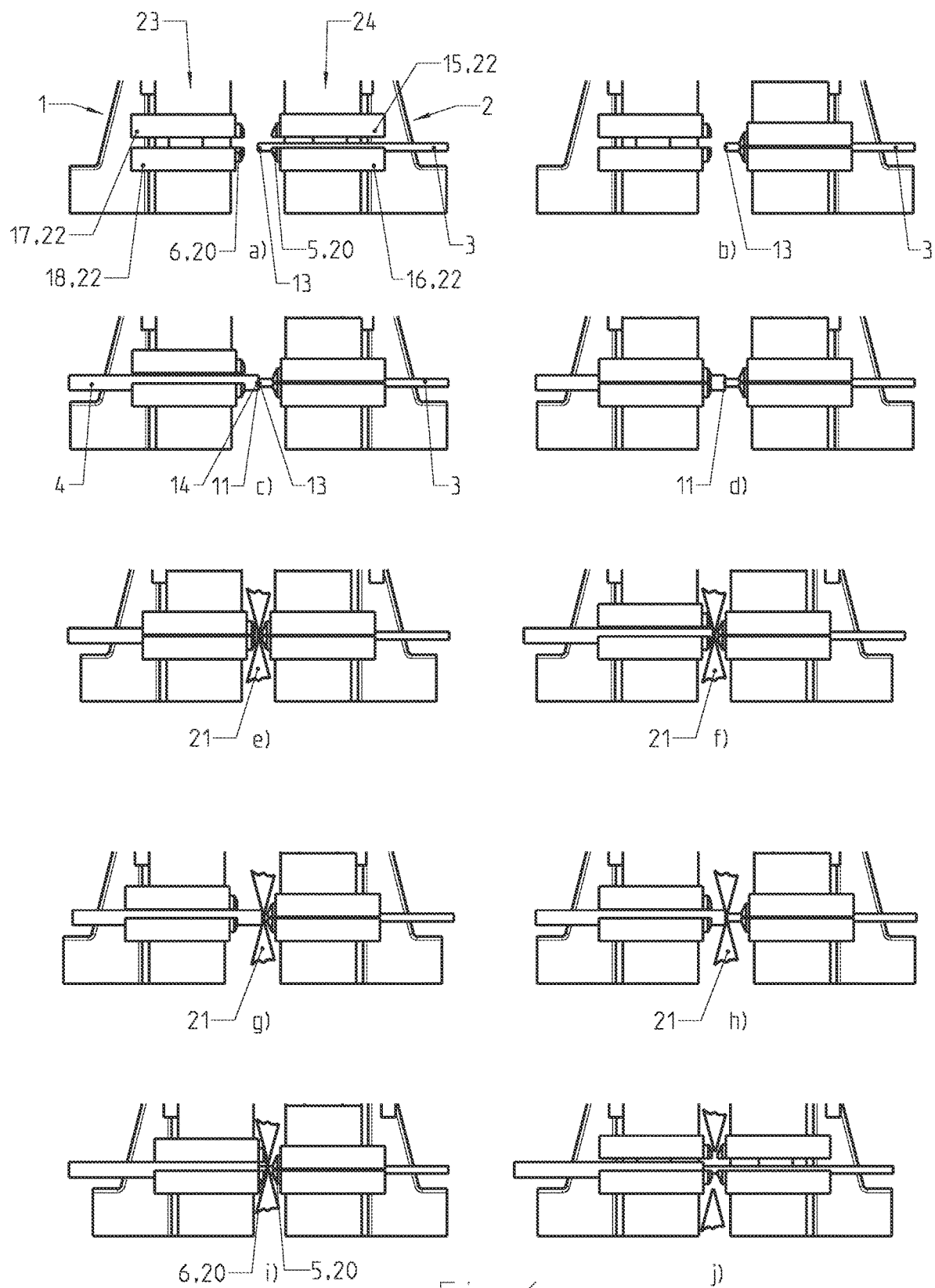

Subsequently, the deburring is carried out as depicted in FIG. 6 *f*) to *i*). Since the wire 3 having the larger diameter was inserted on the left-hand side 23 of the device 10, the deburring is carried out from the left-hand side 23, as can be seen in FIG. 6 *g*) to *i*). Finally, in this embodiment as well, the welded wire 3, 4 is released and can then be removed; see FIG. 6 *j*).

Of course, it can also happen that the wires 3, 4 that are to be joined together do not display any, or else merely insignificant, differences in terms of their geometric dimensions, especially of the wire diameter. In this case, deburring always takes place from the right-hand side 24 of the device. Of course, as an alternative, it can also be provided for the left-hand side 23 to be actuated as a standard procedure.

In the embodiment according to FIGS. 5 and 6, the first wire 4 was first inserted onto the right-hand side 24 of the device 10. As set forth in the invention, however, it is also conceivable for the first wire 3, 4 to first be inserted on the left-hand side 23 of the device 10. In such a case, the method steps according to FIGS. 5 and 6 would be carried out analogously.

LIST OF REFERENCE NUMERALS

1 first clamping member
2 second clamping member
3 workpiece
4 workpiece
5 deburring tool
6 deburring tool
7 sensor
8 sensor
9 drive
10 device
11 weld
12 stop
13 workpiece end
14 workpiece end
15 clamping jaw
16 clamping jaw
17 clamping jaw
18 clamping jaw
19 control unit
20 deburring blade
21 welding burr
222 blade carrier
23 left-hand side
24 right-hand side

The invention claimed is:

1. A butt-welding device (10) for butt welding workpieces (3, 4), comprising:
   first (1) and second (2) clamping members for receiving ends (13, 14) of the workpieces (3, 4) that are to be joined, wherein at least one clamping member (1, 2) is configured to be moved between an initial position and a welding position;
   at least one deburring tool (5, 6) for deburring the workpiece ends (13, 14) after the workpiece ends are welded;
   at least one sensor (7, 8) configured to determine a geometric dimension of the workpieces (3, 4) selected from the group consisting of: diameter, width, height, and a combination thereof, in the joining plane or in a plane substantially parallel to the joining plane, wherein the at least one sensor (7, 8) is arranged above the clamping members (1, 2) on a mount for the clamping members (1, 2); and
   a control unit (19) configured to control movement of the clamping members (1, 2) and/or movement of the deburring tool (5, 6) as a function of the geometric dimension(s) of the workpieces (3, 4) in the joining plane or in a plane substantially parallel to the joining plane so that deburring is performed from a side of the one of the workpieces (3, 4) determined to have a larger geometric dimension than the other one of the workpieces (3, 4).

2. The device (10) according to claim 1, wherein the at least one sensor (7, 8) is a displacement sensor.

3. The device (10) according to claim 1, wherein each deburring tool (5, 6) is associated with one respective clamping member (1, 2) and is configured to be moved together with the associated clamping member (1, 2).

4. The device (10) according to claim 3, wherein the deburring tool is configured to be moved in a same direction of motion of the associated clamping member.

5. The device (10) according to claim 1, wherein the deburring tool is adjustably held on a holder that is optionally connected to one clamping member.

6. The device (10) according to claim 1, wherein each clamping member (1, 2) has two axially adjustable clamping jaws (15, 16, 17, 18) between which the workpiece (3, 4) can be clamped.

7. A method for double-upset resistance butt-press welding of workpieces (3, 4), comprising:
   a) inserting the workpieces (3, 4) having ends (13, 14) and defining end cross sections at the ends that are to be joined into respective first and second clamping members of a butt-welding device,
   b) bringing to a welding site defining a joining plane the ends (13, 14) of the workpieces (3, 4) that are to be joined,
   c) determining with at least one sensor at least one geometric dimension of each of the workpieces (3, 4) selected from the group consisting of: diameter, width, height, and a combination of diameter, width or height, in the joining plane or substantially parallel to the joining plane before butt welding,
d) butt welding the end cross sections of the ends (13, 14) of the workpieces (3, 4) that are to be joined,
e) upsetting the weld (11) of the butt-welded workpiece (3, 4) at an elevated temperature in order to enlarge the cross section of the weld,
f) reducing the enlarged cross section of the weld to a prescribed end cross section of the workpiece (3, 4) with at least one deburring tool (5, 6), and
g) actuating the at least one deburring tool (5, 6) as a function of the geometric dimension(s) of the workpieces (3, 4) that are to be joined so that deburring is performed from a side of the one of the workpieces (3, 4) determined to have a larger geometric dimension in the joining plane or substantially parallel to the joining plane before butt welding than the other one of the workpieces.

8. The method according to claim 7, wherein for workpieces (3, 4) that are to be joined that have different geometric dimensions, the at least one deburring tool (5, 6) employed is associated with the workpiece (3, 4) having the larger geometric dimension.

9. The method according to claim 7, wherein: the at least one deburring tool (5, 6) is associated with at least one clamping member (1,2).

10. The method according to claim 7, wherein the at least one clamping member (1, 2) is moved independently of the deburring tool (5, 6).

11. The device (10) according to claim 1, wherein the workpieces comprise wires, strands and/or profiles.

12. The method according to claim 7, wherein the workpieces comprise wires, strands and/or profiles.

* * * * *